(12) United States Patent
Solomon

(10) Patent No.: US 6,386,573 B1
(45) Date of Patent: May 14, 2002

(54) PLUG-IN TOW DEVICE

(75) Inventor: Robert J. Solomon, Auburn, WA (US)

(73) Assignee: Paccar Inc., Bellevue, WA (US)

( * ) Notice: Subject to any disclaimer, the term of this patent is extended or adjusted under 35 U.S.C. 154(b) by 0 days.

(21) Appl. No.: 09/735,102

(22) Filed: Dec. 11, 2000

(51) Int. Cl.⁷ .............................................. B60D 1/52
(52) U.S. Cl. .................... 280/504; 280/491.5; 280/495
(58) Field of Search ................................ 280/504, 515, 280/514, 491.1, 491.2, 491.5, 495, 496, 493, 901; 172/677, 679

(56) References Cited

U.S. PATENT DOCUMENTS

| | | | | |
|---|---|---|---|---|
| 2,133,065 A | * | 10/1938 | Weber | 280/504 |
| 2,639,160 A | | 5/1953 | Studebaker et al. | 280/495 |
| 2,940,776 A | | 6/1960 | Curtis | 280/504 |
| 3,685,864 A | * | 8/1972 | Hall | 280/515 X |
| 3,801,134 A | * | 4/1974 | Dees | 280/495 X |
| 4,253,680 A | | 3/1981 | Albright et al. | 280/475 |
| 4,298,212 A | * | 11/1981 | Jamison | 280/515 |
| 4,783,094 A | * | 11/1988 | Sands | 280/515 |
| 5,149,122 A | * | 9/1992 | Helber | 280/491.2 |
| 5,472,222 A | * | 12/1995 | Marcy | 280/491.5 X |
| 5,685,554 A | * | 11/1997 | Poxleitner | 280/491.2 |
| 5,853,187 A | | 12/1998 | Maier | 280/511 |
| 5,860,671 A | | 1/1999 | Mackeown | 280/511 |
| 5,871,222 A | | 2/1999 | Webb | 280/511 |
| 6,099,015 A | * | 8/2000 | Marcy | 280/491.5 X |
| 6,149,181 A | * | 11/2000 | Biederman | 280/491.1 |

* cited by examiner

*Primary Examiner*—Eric Culbreth
*Assistant Examiner*—F. Zeender
(74) *Attorney, Agent, or Firm*—Christensen O'Connor Johnson Kindness PLLC

(57) ABSTRACT

A towing device is provided including a bracket (12) and an elongate hitch rod (14). The bracket (12) includes a longitudinal bore (34) and one or more pins (36) oriented transverse to the longitudinal bore (34). An end portion of each pin extends partially into the longitudinal bore. The hitch rod (14) includes a cylindrical shaft (50) and a clevis (52) connected to the shaft's distal end. The clevis (52) is attached to the shaft (50) in a manner that weights the shaft in a desired orientation. The shaft (50) includes at least one groove (60) with a spiral portion (62) and a notch (64). The spiral portion (62) extends from the shaft's proximal end and ends with the notch (64). During use, the transverse pin (36) engages the notch (64), thereby locking the rod (14) with the bracket (12). The weighted orientation of the shaft encourages this engaged arrangement.

17 Claims, 4 Drawing Sheets

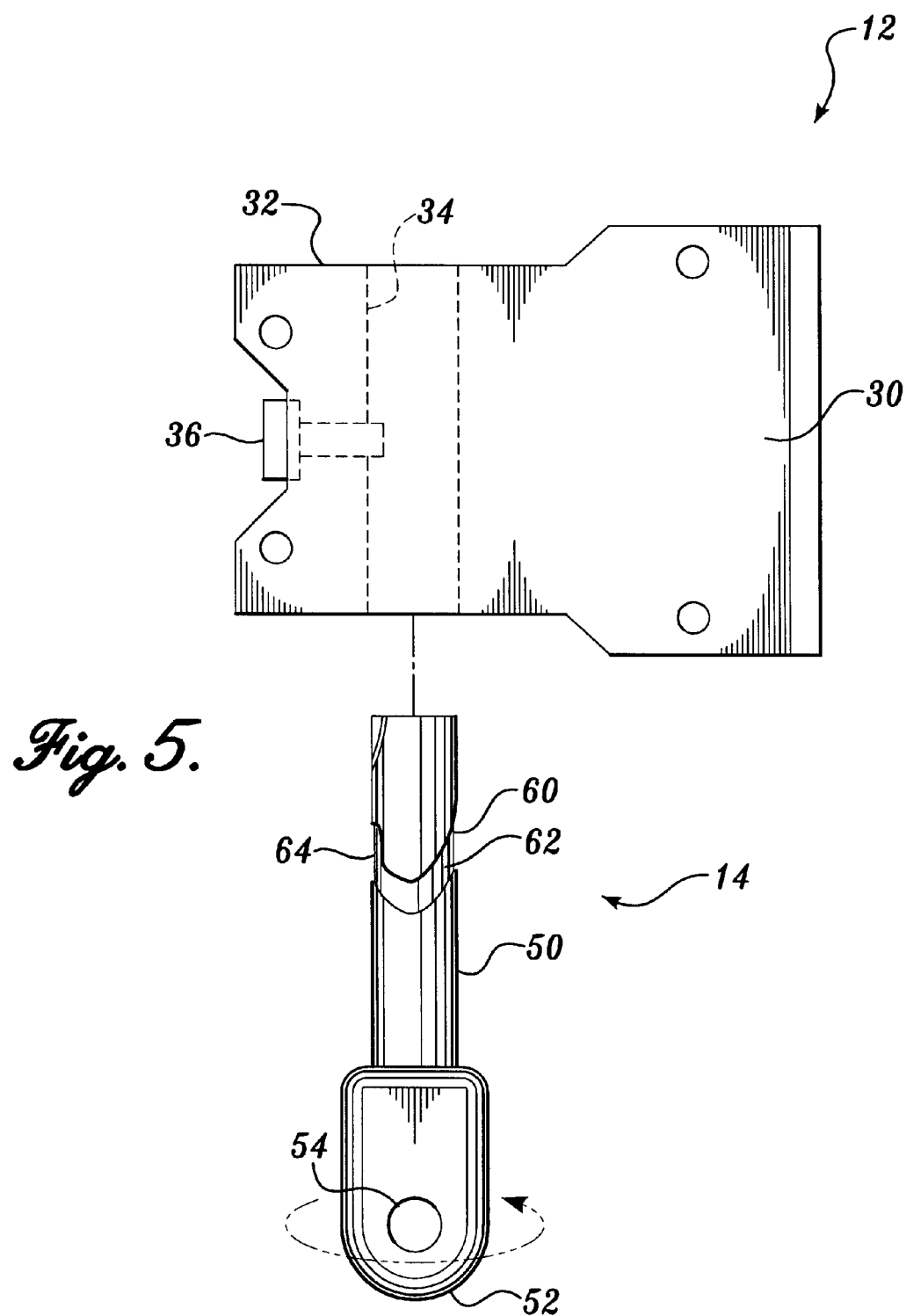

PLUG-IN TOW DEVICE

FIELD OF THE INVENTION

The present invention relates to land vehicles and vehicle mounting or clamps, and more particularly, to a towing device having one portion detachably attached to the vehicle and another portion engageable with the first portion.

BACKGROUND OF THE INVENTION

Current front tow hitch designs for use with large, heavy vehicles, such as tractor-trailers, semi's and the like, are typically located on the underside of the vehicle. These designs are notoriously difficult to reach and awkward to operate.

A need exists for an improved large vehicle tow hitch that would be more easily accessed and easily used. Optimally, such a design would be attached directly to a forward location along the vehicle's main frame, so as to put minimal stress on associated brackets in transferring loads from the tow hitch to the frame. In addition, the ideal hitch should be located as close to the center of the front of the vehicle as possible, to align the vehicle with whatever machinery is towing it. The present invention is directed to fulfilling these needs and others as described below.

SUMMARY OF THE INVENTION

In accordance with aspects of the present invention, a towing device is provided including a bracket and an elongate hitch rod. The bracket includes a longitudinal bore and one or more pins oriented transverse to the longitudinal bore. An end portion of each pin extends partially into the longitudinal bore. The hitch rod includes a cylindrical shaft and a clevis connected to the shaft's distal end. The clevis is attached to the shaft in a manner that weights the shaft in a desired orientation. The shaft includes at least one groove with a spiral portion and a notch. The spiral portion extends from the shaft's proximal end and ends with the notch. During use, the transverse pin engages the notch, thereby locking the rod with the bracket. The weighted orientation of the shaft encourages this engaged arrangement.

In accordance with other aspects of the invention, a more generic embodiment is described in which a bracket includes a longitudinal bore with a transverse protrusion extending partially into the longitudinal bore. A hitch rod is provided and formed as a cylindrical shaft with a groove located therealong. The groove includes a spiral portion and a notch, with the spiral portion extending from the shaft's proximal end and ending with the notch. During use, an operator inserts the shaft's proximal end into the longitudinal bore, engaging the groove with the transverse protrusion. While continuing to insert the shaft into the bore, the operator moves the shaft so that each protrusion follows its respective groove until engaging the notch.

In one embodiment, the hitch rod includes a desired orientation, the hitch rod being weighted to move to the desired orientation. In another embodiment, the hitch rod includes a connection member connected to the shaft distal end. The connection member is attached to the shaft in a manner that weights the shaft in a desired orientation. In yet another embodiment, the connection member is a clevis.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a plan view of the device of FIG. 1.

DETAILED DESCRIPTION OF THE PREFERRED EMBODIMENT

Figure 1:
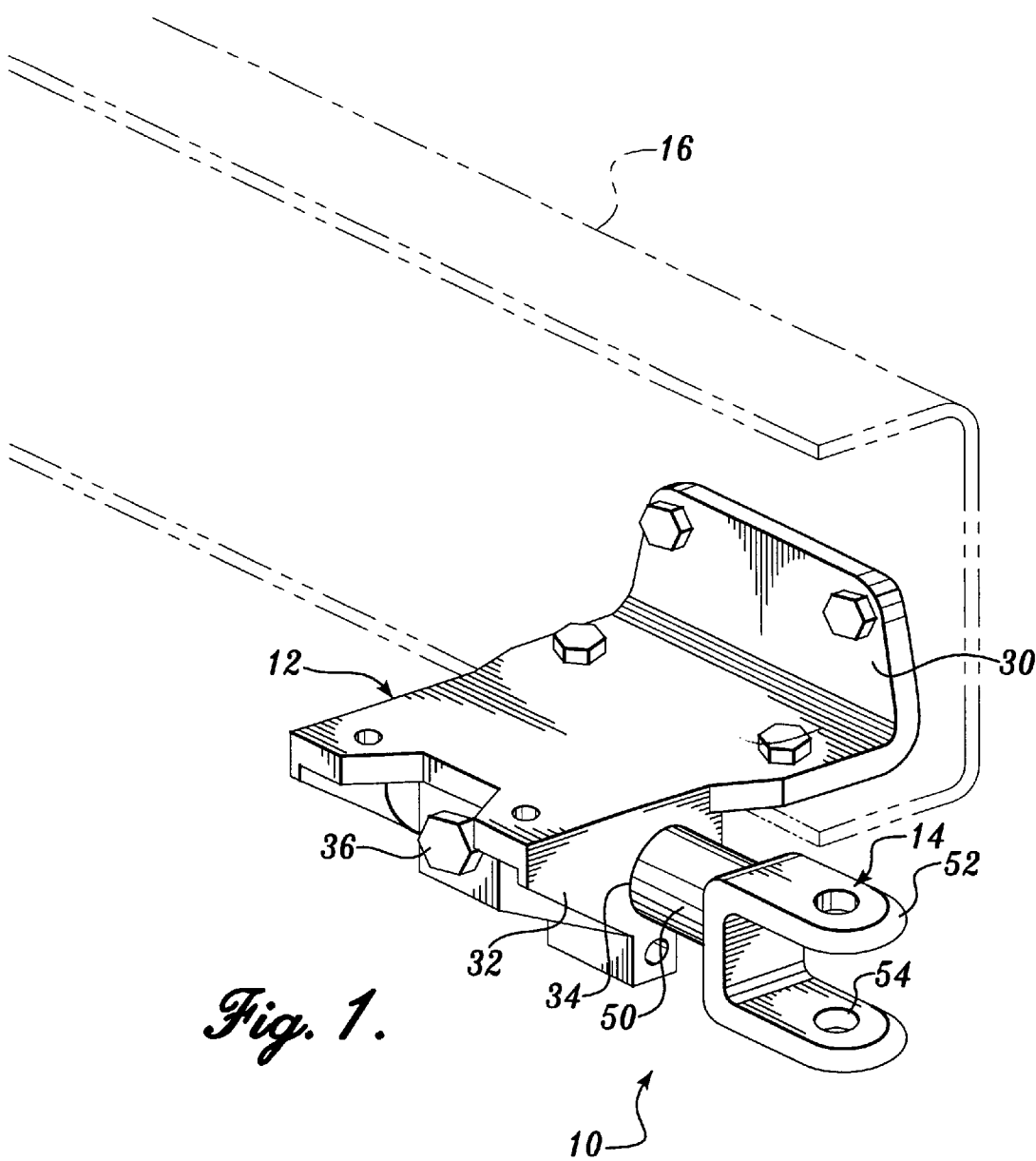
FIG. 1 is a perspective view of one embodiment of a plug-in tow device formed in accordance with the present invention.
Figure 2:
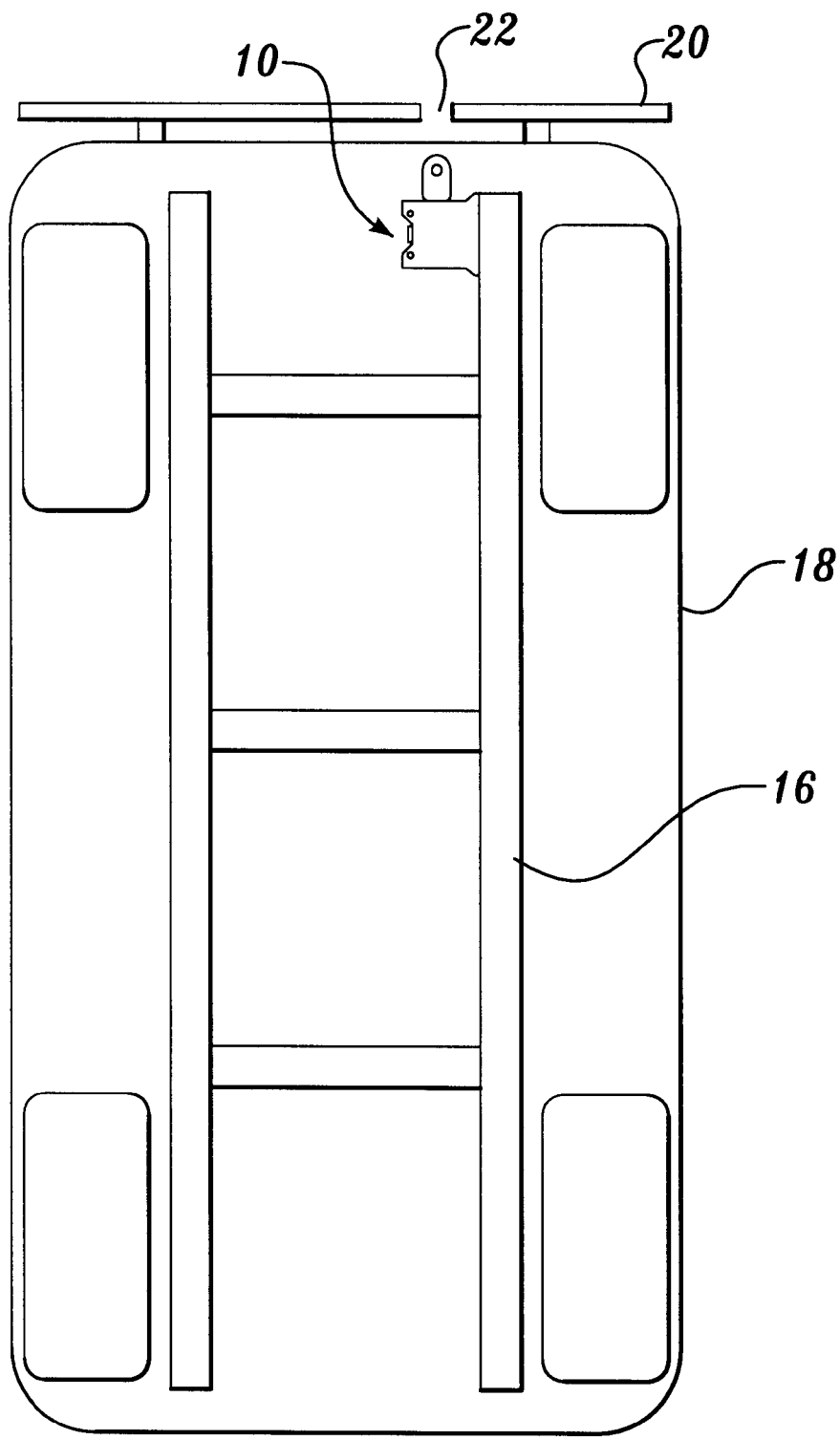
FIG. 2 is a bottom up schematic plan view of the plug-in tow device of FIG. 1 as installed in a vehicle.

Referring to FIG. 1, the present invention is a plug-in tow device 10 having a bracket 12 and a hitch rod 14. The bracket 12 is attached to a forward end of one of the vehicle's main rail frames 16. In the embodiment shown in FIG. 1, the frame 16 is a C-shaped beam, and the bracket 12 is bolted directly to the frame 16. FIG. 2 is a bottom-up schematic plan view of the plug-in tow device 10 showing their relative placement. The vehicle includes a body 18 and a forward bumper 20. An opening 22 in the bumper is provided to accommodate the hitch rod, as described below.

Referring to FIGS. 1 and 5, the bracket includes an attachment flange 30 that is shaped to correspond to the shape of frame 16. A body portion 32 includes a longitudinal bore 34 and a transverse pin 36. In one embodiment, the longitudinal bore is cylindrically shaped with a diameter in the range of about 1.5 inches to about 3.0 inches. The pin 36 is positioned within the body 32 such that the distal end of the pin extends a small distance transversely into the bore 34, for example, by an amount of about 0.2 to about 0.5 inches. In one embodiment, the pin extends into the bore at a location from the front of the bracket in the range of about 6 inches to about 10 inches.

As shown in the embodiment of FIG. 1, the body 32 may further include various flanges and holes to accommodate other components. The pin is formed of a material known to those of skill in the art, such as from an aluminum or iron material. In the embodiment of FIG. 1, the pin is a component that is formed separately from the bracket itself. In this regard, the pin may be threaded to the bracket or pressed into place. Alternatively, the pin may be integrally formed with the bracket, if desired.

Figure 3:
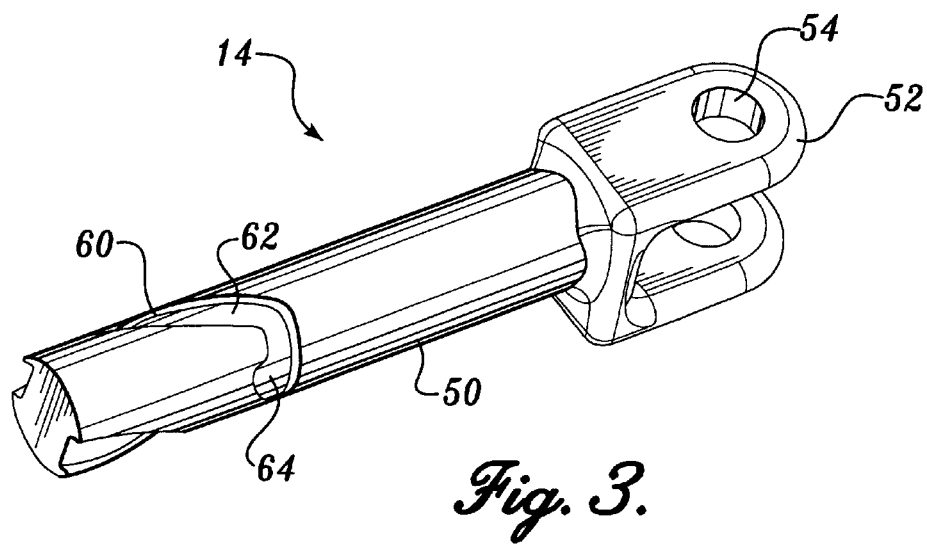
FIG. 3 is a perspective view of a hitch rod formed in accordance with the present invention.
Figure 4:
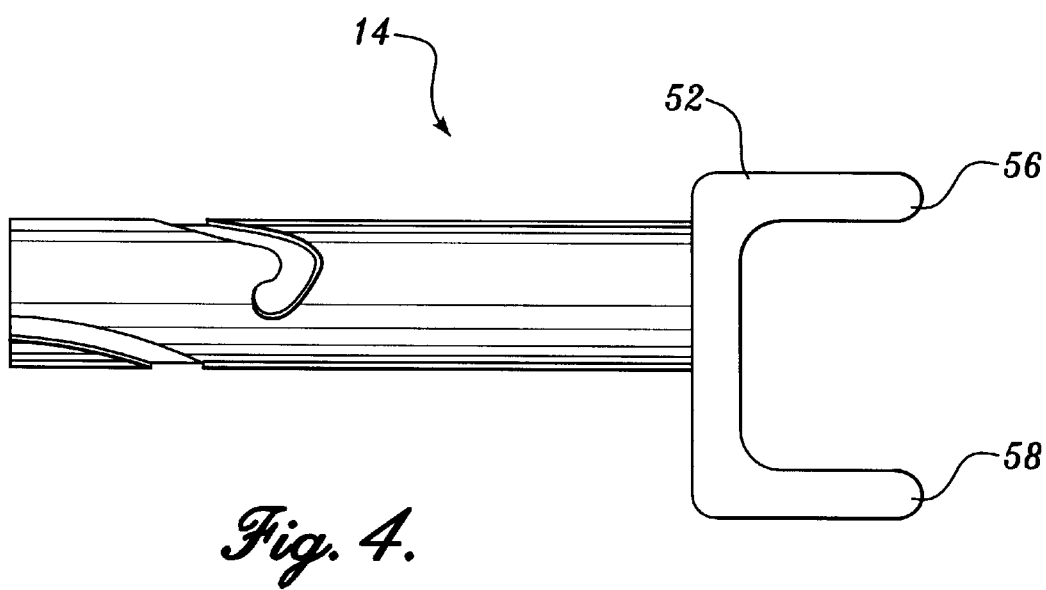
FIG. 4 is a side view of the hitch rod shown in FIG. 3.

The hitch rod 14 includes a cylindrical shaft 50 and a clevis 52, as shown best in FIG. 3. In one embodiment, the elongate hitch rod is a steel rod of a length in the range of about 12 inches to about 20 inches, with the shaft having a length of an amount in the range of about 10 inches to about 18 inches. The clevis includes opposed upper and lower arms 56, 58, respectively. Holes 54 extend through each arm and are aligned to one another. Referring particularly to FIG. 4, the clevis 52 is attached to the shaft 50 such that the center of gravity of the clevis is below the center of gravity for the shaft. This is easily accomplished by off-setting the clevis relative to the shaft so that the mass of,the lower arm 58 is farther from the shaft than is the mass of the upper arm 56. As will be appreciated by those of skill in the art, other types of connection heads could be used in lieu of a clevis/pin arrangement. For example, a simple ring may be provided.

Referring to FIG. 3, the shaft 50 includes one or more grooves 60. By using two opposed grooves 60, the plug-in tow device 10 can be located on either left or right side rail frames. In the embodiment of FIG. 3, there are two grooves located on opposite sides of the shaft. Each groove includes a spiral portion 62 and a notch portion 64. The notch portion 64 is placed so that, when the hitch rod is located in an upright orientation (as is shown in FIG. 4), the notch is positioned along the side of the shaft, approximately mid-height. The notch is oriented rearward. In one embodiment, each groove extends a total longitudinal distance along the shaft by an amount in the range of about 4 inches to about 8 inches.

To connect the hitch rod with an installed bracket, an operator inserts the hitch rod through the bumper opening and into the longitudinal bore 34. The hitch rod should be oriented so that the groove will engage the transverse pin within the bore. For the embodiments shown, this means basically orienting the hitch rod upside down when inserting it into the bore.

The operator then pushes the hitch rod while rotating it. The rod follows the connection of the fixed pins within the grooves. As shown in FIG. 2, the opening in the bumper may be made large enough to clear the rod clevis, or alternatively, the hitch rod may be made long enough to extend out the bumper opening. After the hitch is nearly fully inserted, the grooves change direction and thereby force the transverse pin into the recessed notch 64. This secures the connection of the rod 14 to the drive bracket 12, particularly as the weight of the vehicle as it's towed will tend to trap the pin into the rearward facing notch. Removal of the hitch is done in reverse order.

As will be appreciated from a reading of the above, the present invention has a number of benefits. The hitch rod may be installed into the bracket without any tools or separate cross-pin pieces, which could be easily misplaced. In addition, by weighting the hitch rod with the offset clevis, the hitch rod will always move to its weighted orientation, thus ensuring that it remaining within the notch 64.

While the preferred embodiment of the invention has been illustrated and described, it will be appreciated that various changes can be made therein without departing from the spirit and scope of the invention. For example, the bracket may be equipped with two transverse pins, located opposite one another, and two grooves. In such an embodiment, each groove would engage a pin, thereby providing a redundant rod-bracket connection.

The embodiments of the invention in which an exclusive property or privilege is claimed are defined as follows:

1. A towing device comprising:
   (a) a bracket connectable to a vehicle, the bracket having a longitudinal bore and at least one pin oriented transverse to the longitudinal bore, an end portion of the pin extending partially into the longitudinal bore; and
   (b) an elongate hitch rod including a cylindrical shaft with a distal end and a proximal end and a clevis connected to the shaft distal end; the clevis being attached to the shaft in a manner that weights the shaft in a desired orientation; the shaft including at least one groove with a spiral portion and a notch; the spiral portion extending from the shaft proximal end and ending with the notch;
   wherein during use, the longitudinal bore and the hitch rod are both oriented laterally and the at least one transverse pin engages the notch, the weighted orientation of the shaft and the lateral orientation of the bore and rod thus encouraging the engaged arrangement.

2. The towing device of claim 1, wherein the bracket includes an attachment flange adapted to connect to a vehicle main frame rail.

3. The towing device of claim 1, wherein the at least one pin extends into the bore by an amount in the range of about 0.2 inches to about 0.5 inches.

4. The towing device of claim 1, wherein the at least one pin is located approximately mid-way along the longitudinal bore.

5. The towing device of claim 1, wherein the at least one pin is separable from the bracket and is connected thereto by being threaded or pressed into the bracket.

6. The towing device of claim 1, wherein the bracket includes a single pin oriented transverse to the longitudinal bore.

7. The towing device of claim 6, wherein the longitudinal bore is cylindrically shaped with a diameter in the range of about 1.5 inches to about 3.0 inches; the pin extending into the bore at a location in the range of about 6 inches to about 10 inches from the front of the bracket.

8. The towing device of claim 1, wherein the elongate hitch rod is of a length in the range of about 12 inches to about 20 inches.

9. The towing device of claim 1, wherein the elongate hitch rod is formed from steel.

10. The towing device of claim 1, wherein the clevis includes an upper arm and a lower arm; the upper arm being located closer to the shaft than the lower arm.

11. The towing device of claim 1, wherein the shaft includes a single groove with a spiral portion and a notch.

12. The towing device of claim 1, wherein the shaft is of a length in the range of about 10 inches to about 18 inches; and wherein the at least one groove extends a total longitudinal distance along the shaft by an amount in the range of about 4 inches to about 8 inches.

13. The towing device of claim 1, wherein the spiral is located about the shaft in a clockwise direction.

14. A towing device for use in towing an object, comprising:
   (a) a bracket connectable to a vehicle, the bracket having a longitudinal bore and at least one transverse protrusion extending partially into the longitudinal bore;
   (b) a hitch rod formed as a cylindrical shaft with a distal end and a proximal end, the shaft including at least one groove with a spiral portion and a notch; the spiral portion extending from the shaft proximal end and ending with the notch;
   the hitch rod being biased toward a weighted orientation; the longitudinal bore and the hitch rod both being oriented laterally during use; and
   wherein during use, the proximal end of the shaft is inserted into the longitudinal bore, engaging the at least one groove with the at least one transverse protrusion; during insertion of the shaft into the bore, each protrusion follows its respective groove until engaging the notch: the lateral orientation of the bore and the lateral and weighted orientation of the rod encouraging engagement of the protrusion in the notch.

15. The towing device of claim 14, wherein the hitch rod includes a desired orientation, the hitch rod being weighted to move to the desired orientation.

16. The towing device of claim 15, wherein the hitch rod includes a connection member connected to the shaft distal end; the connection member being attached to the shaft in a manner that weights the shaft in the desired orientation.

17. The towing device of claim 16, wherein the connection member is a clevis.

\* \* \* \* \*